(12) United States Patent
Haddad et al.

(10) Patent No.: US 8,772,968 B2
(45) Date of Patent: Jul. 8, 2014

(54) SWITCHING CONFIGURATION AND PROCEDURE FOR THE PRODUCTION OF ONE ALTERNATING VOLTAGE FROM A MAJORITY OF UNRELATED SUPPLY TERMINALS WITH TEMPORALLY VARIABLE OUTPUT DC VOLTAGE

(75) Inventors: Kevork Haddad, Newark Valley, NY (US); Dejan Schreiber, Nuremberg (DE)

(73) Assignee: Semikron Elektronik GmbH & Co., KG, Nürnberg (DE)

( * ) Notice: Subject to any disclaimer, the term of this patent is extended or adjusted under 35 U.S.C. 154(b) by 496 days.

(21) Appl. No.: 13/077,389

(22) Filed: Mar. 31, 2011

(65) Prior Publication Data

US 2011/0304210 A1   Dec. 15, 2011

Related U.S. Application Data

(60) Provisional application No. 61/319,603, filed on Mar. 31, 2010.

(51) Int. Cl.
*H02J 3/00* (2006.01)
*H02J 1/10* (2006.01)
(52) U.S. Cl.
USPC .................................. 307/82; 307/11; 307/43
(58) Field of Classification Search
None
See application file for complete search history.

(56) References Cited

U.S. PATENT DOCUMENTS

| 2002/0136029 A1 | 9/2002 | Ledenev et al. |
| 2004/0183513 A1* | 9/2004 | Vinciarelli ................. 323/284 |
| 2010/0019754 A1 | 1/2010 | Schreiber |

FOREIGN PATENT DOCUMENTS

| DE | 10 2007 022 315 A1 | 11/2008 |
| DE | 10 2008 034 955 | 2/2010 |

\* cited by examiner

*Primary Examiner* — Jared Fureman
*Assistant Examiner* — Aqeel Bukhari
(74) *Attorney, Agent, or Firm* — The Law Offices of Roger S. Thompson

(57) ABSTRACT

A circuit, having a plurality of regulated, parallel, voltage sources, an a.c.-d.c. converter circuit and a regulating unit, and a method for controlling it. The regulated voltage sources include an unregulated voltage source of a temporally variable output d.c. voltage, a step-up converter and an associated regulating device, where the step-up converter is a three-point step-up converter. The regulating unit measures the intermediate circuit voltage of the a.c.-d.c. converter circuit and is connected with the regulating devices. In the method for control, the regulating unit determines the voltage in the intermediate circuit of the a.c.-d.c. converter circuit and from this determines, as a function of the maximally and minimally permissible intermediate circuit voltage, a set-point value for the output voltage of the regulated voltage sources. This set-point value is transmitted to the regulating devices, from which the regulating devices determine the control conditions for the step-up converter.

13 Claims, 3 Drawing Sheets

SWITCHING CONFIGURATION AND PROCEDURE FOR THE PRODUCTION OF ONE ALTERNATING VOLTAGE FROM A MAJORITY OF UNRELATED SUPPLY TERMINALS WITH TEMPORALLY VARIABLE OUTPUT DC VOLTAGE

CROSS REFERENCE TO RELATED APPLICATIONS

This application claims priority from U.S. Provisional Patent Application Ser. No. 61/319,603 which was filed on Mar. 31, 2010.

BACKGROUND OF THE INVENTION

1. Field of the Invention

The invention is directed to a circuit, as well as a method for controlling the circuit, for generating an a.c. voltage from a plurality of unregulated voltage sources with temporally variable d.c. output voltages, such as photovoltaic installations, or parts of these installations.

2. Description of the Related Art

As used herein, a "photovoltaic installation" is intended to refer to an arrangement and electrical connection of a plurality of individual photovoltaic modules, as well as to partial installations thereof. Such photovoltaic modules are combined into photovoltaic installations, and as a condition of the type of their construction, have a compensating a.c. voltage which is dependent on the incoming solar radiation, which is therefore slowly temporally variable, i.e., it varys over time. These changes in the compensating a.c. voltage show time constants in the range of minutes or longer units of time.

To feed the output voltage of a photovoltaic installation into the public or the local electrical power grid it is necessary to convert the compensating a.c. voltage to an a.c. voltage of constant frequency and voltage by means of an a.c.-d.c. converter circuit.

An exemplary circuit for generating such an a.c. voltage is described in DE 10 2008 034 955 A1, which discloses a photovoltaic installation of a temporally variable output voltage, a level converter and an a.c.-d.c. converter. In the associated method, first and second capacitors of the level converter are charged independently of the natural voltage with respectively half the value of the rated intermediate circuit voltage.

A multitude of requirements exists for such circuits, which requirements are dependent on the particular application and which partially conflict with each other. For example, the individual photovoltaic modules should be charged linearly, if possible, i.e., within time intervals which are typical for output semiconductor circuits. Their output current should be as temporally constant as possible, i.e., within a time range of less than one second, or in a frequency range above 1 Hz. Also, the input voltage at the a.c.-d.c. converter circuit should be as constant as possible, and the transfer from the photovoltaic installation to the a.c.-d.c. converter circuit should take place at the highest possible voltage to keep output losses low. Finally, the entire circuit arrangement should operate at a high level of efficiency. At the same time, the photovoltaic installation, or the individual photovoltaic modules, should be operated so that they operate at the point of the highest output (MPP—maximum power point). A suitable regulation, so-called MPP tracking, is required to accomplish this.

SUMMARY OF THE INVENTION

It is therefore an object of the invention to provide a circuit, and an associated method, for generating an a.c. voltage from a plurality of voltage sources, each with a temporally variable output voltage, in which a broad d.c. voltage range of these voltage sources may be efficiently utilized, and the transmission of the a.c.-d.c converter circuit incurs the lowest possible losses.

The inventive circuit has a plurality of regulated, switched-in-parallel voltage sources, at least one d.c.-a.c. converter circuit, which can be connected with a transformer, and a regulating unit.

Here, each of the regulated voltage sources consists of an unregulated voltage source with a temporally variable output d.c. voltage, a step-up converter and an associated regulating device. The unregulated voltage source preferably is a photovoltaic installation, and its outputs can be additionally connected by a capacitor.

Through its inputs, the step-up converter itself is connected to the outputs of the unregulated voltage source and has an electrical current path of positive polarity, the positive branch, and an electrical current path of negative polarity, the negative branch. A first coil is arranged at the input of the positive branch of the step-up converter, and on its output the anode of a first diode is connected, whose cathode is directly connected to the output of positive polarity of the step-up converter, which at the same time constitutes the output of the regulated voltage source. Arranged at the input of the negative branch of the step-up converter is a second coil, and on its output the cathode of a second diode, whose anode is directly connected with the negative output of the step-up converter and which simultaneously constitutes the output of negative polarity of the regulated voltage source.

A semi-bridge circuit consisting of a first and a second power transistor is arranged between the anode of the first diode and the cathode of the second diode and connects the two branches. A series circuit of two capacitors is arranged between the cathode of the first diode and the anode of the second diode, also connecting the two branches. The respective center taps of the semi-bridge circuit and of the series circuit of the capacitors are connected with each other and can be simultaneously connected with the ground potential.

Furthermore, each regulated voltage source has a regulating arrangement for its regulation, i.e., the control of the first and second power transistors, which is connected with the regulating unit. This central regulating unit is connected with a measuring arrangement for the intermediate circuit voltage of the a.c.-d.c. converter circuit and controls the regulating devices of the regulated voltage sources.

The inventive method for controlling such a circuit is novel at least because the regulating unit determines the voltage in the intermediate circuit of the a.c.-d.c. converter circuit and, as a function of the maximally and minimally permissible intermediate circuit voltage, determines from this a set-point value for the output voltage of the regulated voltage sources. This set-point value is transmitted to the regulating devices. There, the control conditions for the respective step-up converter are determined, and the latter is correspondingly controlled.

It can also be advantageous if the regulating units of the regulated voltage sources report the output d.c. voltage of the unregulated d.c. voltage sources and/or the amplification factor of their own step-up converter back to the regulating unit. In this way this report can flow back into the determination of a new set-point value of the output voltage of the regulated voltage sources.

In the same way it can be advantageous if the step-up converters of the respective voltage sources are clocked, temporally offset in respect to one another, and possibly additionally slightly phase-shifted. In this case, the phase shift within a switching period is proportional to the reciprocal value of the number of voltage sources, or to a small, whole-number multiple thereof. Especially in this case, but not limited thereto, it could furthermore be particularly preferred if the first and second coils of adjoining voltage sources were arranged on a common core. This leads to a coupling effect of the coils, such as is also the case in a transformer. To utilize this coupling effect as efficiently as possible, the total offset of the clocked operation of the respective step-up converters of adjoining current sources should lie exactly at, or as closely as possible to, a quarter of the switching period.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
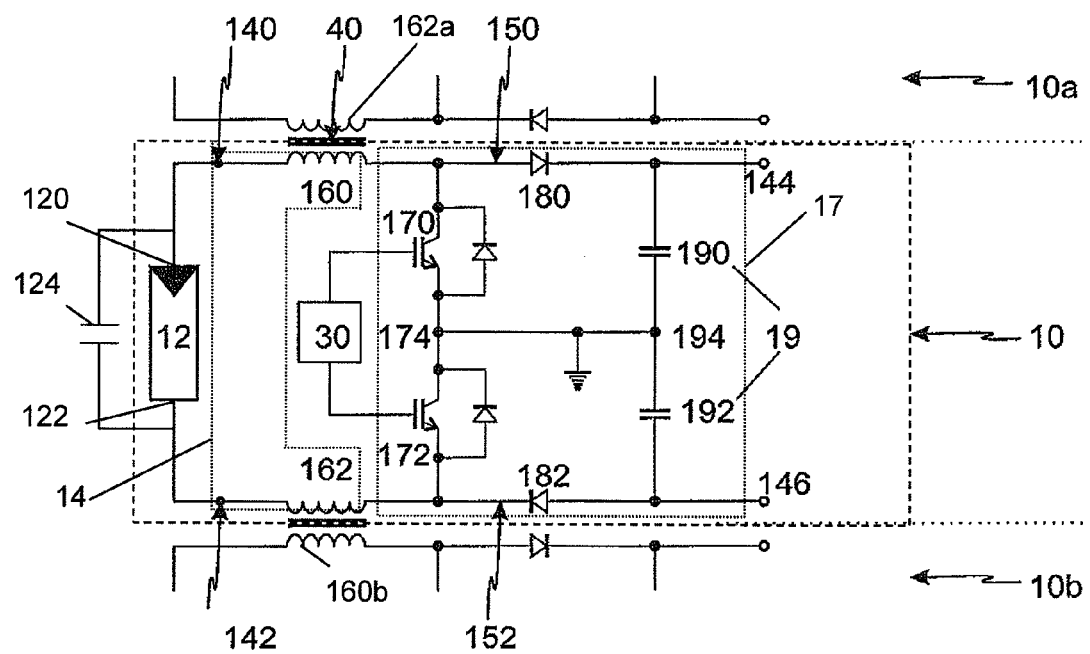
FIG. 1 shows a regulated voltage source of a circuit in accordance with the invention.
Figure 2:
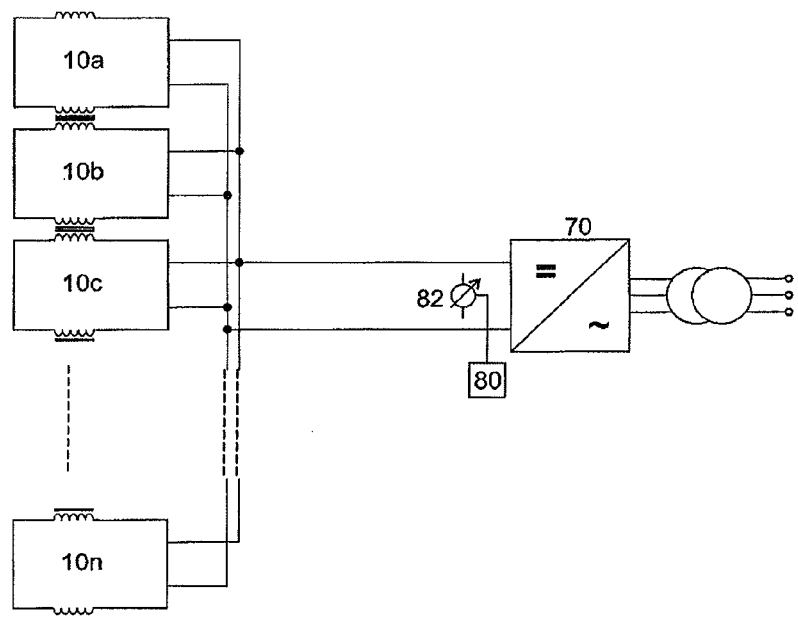
FIG. 2 shows a circuit in accordance with the invention.

FIG. 1 shows a regulated voltage source 10 of the inventive circuit, as well as, but only partially represented, two further regulated voltage sources 10a, 10b, adjacent to regulated voltage source 10. Supply to each regulated voltage source 10 respectively takes place from an unregulated voltage source 12 in the form of a photovoltaic installation. Here, typical values of the output d.c. voltage of unregulated voltage source 12 during normal operations lie between 300V and 900V, depending on the respective time of year and incident solar radiation. A step-up converter 14 within regulated voltage source 10 raises this temporally varying d.c. voltage to a voltage value predetermined by a regulating unit 80 (FIG. 2).

To this end, step-up converter 14 is connected with inputs 140, 142 to outputs 120, 122 of unregulated voltage source 12. First and second coils 160, 162 are arranged at inputs 140, 142, respectively of both branches of step-up converter 14 and are connected with diodes 180, 182, as described above.

The two branches are furthermore connected by means of a semi-bridge circuit (17) of first and second power transistors (170, 172) having a center tap (174) and the series connection (19) of two capacitors (190, 192) likewise having a center tap (194). Control of the step-up converter (14) takes place by means of a local regulating unit (30) as a function of the required amplification factor, in that the two power transistors (170, 172) are switched on in a cyclically offset manner, with or without an overlap of the length of time they are switched on. By means of this control it is possible to increase the input voltage by up to a factor of five, without the losses becoming particularly significant because of this. It is thus possible, departing from the above mentioned voltage values of the unregulated voltage source (12), to constantly maintain an intermediate circuit voltage of 1200 V or also 1700 V at the a.c.-d.c. converter circuit, see FIG. 2.

However, it is particularly advantageous here that first coil 160 of regulated voltage source 10 is arranged on a common core 40 together with the second coil 162a of first adjoining regulated voltage source 10a, as is second coil 162 of regulated voltage source 10 with the corresponding first coil 160 of second adjoining regulated voltage source 10b.

FIG. 2 shows a circuit in accordance with the invention. There, a plurality of regulated voltage sources 10a-10n is represented, each substantially as described in FIG. 1. The outputs of positive polarity 144, 145 (see FIG. 1) of regulated voltage sources 10 are connected with each other and with the associated input of an a.c.-d.c. converter circuit 70 over a connecting line.

In its simplest embodiment, a.c.-d.c. converter circuit 70 is a two-point, three-phase a.c.-d.c. converter, which is connected through a transformation with the electrical network to be supplied. However, it is particularly advantageous if the a.c.-d.c. converter circuit is embodied as a three point a.c.-d.c. converter. In this case, it is possible to use power semiconductor modules of the same voltage class for the respective step-up converters 14, and also the a.c.-d.c. converter circuit 70. In addition, it is possible to select the transmission voltage to be higher in respect to the voltage class of these power semi-conductor modules than in a two-point a.c.-d.c. converter constructed of power semi-conductor modules of the same voltage class as step-up converters 14.

The inventive circuit furthermore has a measuring device 82 for measuring the intermediate circuit voltage, which is connected with a higher regulating unit 80. As a function of the measured value of the intermediate circuit voltage, and possibly further parameters, regulating unit 80 acts on regulating devices 30 of step-up converters 14, so that regulated voltage sources can set the respective amplification factor in accordance with the set-point value.

Moreover, regulating unit 80 also generates the required control signals for the offset, and possibly additionally phase-shifted voltage sources 10 in respect to each other.

Figure 3A:
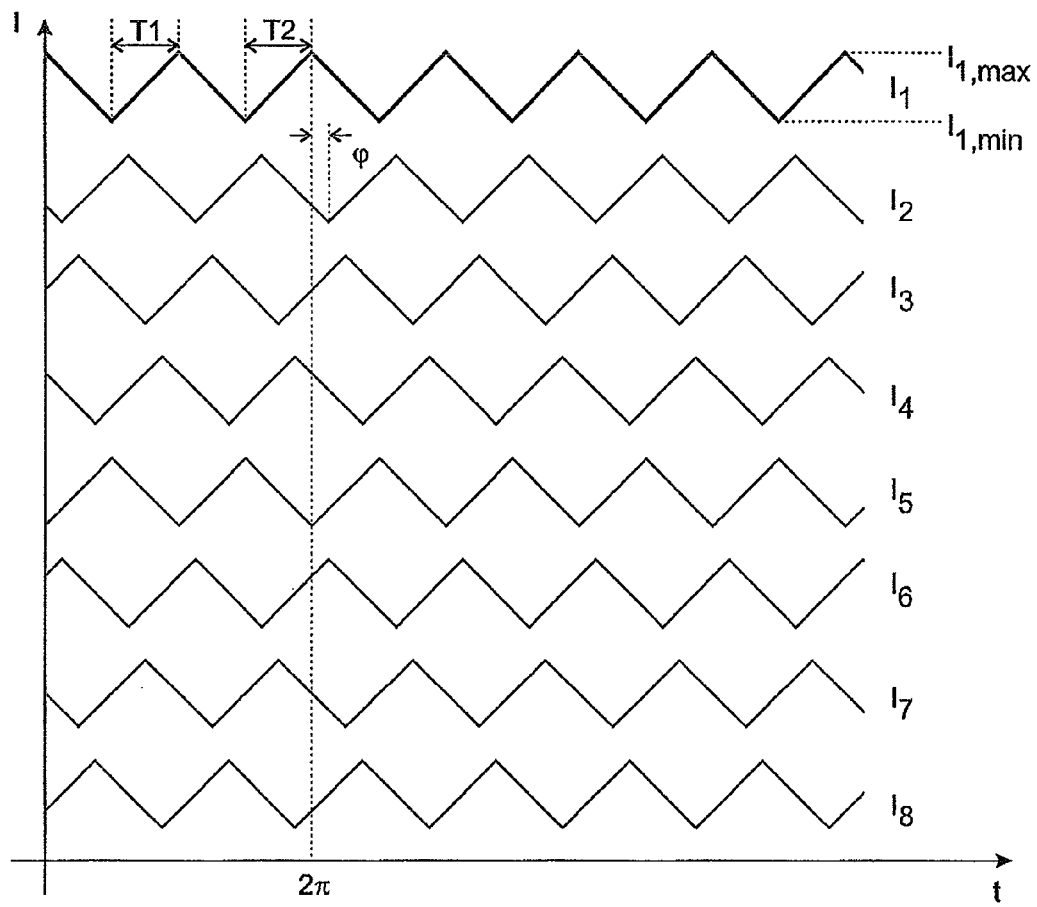
FIGS. 3a and 3b show electrical current paths through adjoining first and second coils of a regulated voltage source when using the inventive method.

FIG. 3 schematically represents the electrical current paths through first and second coils 160, 162 of a circuit with eight regulated voltage sources 10 in connection with the inventive method with an offset and phase-shifted cyclical operation of regulated voltage sources 10. In this case, the respective coil current through first and second coils 160, 162 is approximately equal. FIG. 3a shows coil currents 1 to 8 from eight regulated voltage sources 10, in which power transistors 170, 172 of each semi-bridge circuit 17 are switched on, offset from each other by half a period length $\pi$, for respectively a quarter period length $\pi/2$. In this way, an approximately saw-tooth-shaped course of the coil current between a minimal (I1.min) and a maximal (I1.max) value results for the respective first and second coils of a regulated voltage source. Here, the length of $\pi/2$ of the first switch being switched-on causes the first electrical current increase within a switching period $2\pi$, and the length of being switched on of $\pi/2$ of the second switch causes the second electrical current increase within a switching period $2\pi$, which results in a doubling of the voltage at the output of the regulated voltage source in comparison to the output of the unregulated voltage source.

In accordance with a preferred embodiment of the control, the semi-bridge circuits of the respectively adjoining regulated voltage sources are controlled, offset by, approximately a quarter of a period length $\pi/2$. Added to this offset is the phase shift ($\phi$) which, with eight voltage sources, for reasons of symmetry corresponds to $\phi/16$, so that a total offset of the triggering of adjoining step-up converters of $\pi/2+16/\pi=9\pi/16$ within the switching period results. By means of this, a desired, substantially regular voltage is achieved in the connecting lines and at the input of the a.c.-d.c. converter circuit.

However, with this offset and phase-shifted clocked operation of the step-up converters 14 of the regulated electrical current sources 10, the respective unregulated voltage sources 12 are also possibly not sufficiently evenly under load, i.e., the electrical current at their output is not substantially constant over time. But this is a required mode of operation, particularly in connection with photovoltaic installations, to prolong their service life. To linearize this load, it is necessary, as already mentioned above, in addition to the offset clocked operation, to preferably provide a common core 40 for first and second coils 160, 162 of adjacent regulated voltage sources.

With this said mode of operation and with this arrangement, energy is transferred by the action of the transformer from a regulated voltage source 10 to one, or preferably both, adjoining regulated voltage sources, 10a, 10b, because of which the total electrical current through the coils fluctuates considerably less over time than without this transformer action. Therefore, the unregulated voltage sources are considerably more evenly under load, because their electrical output current is now substantially constant.

Figure 3B:
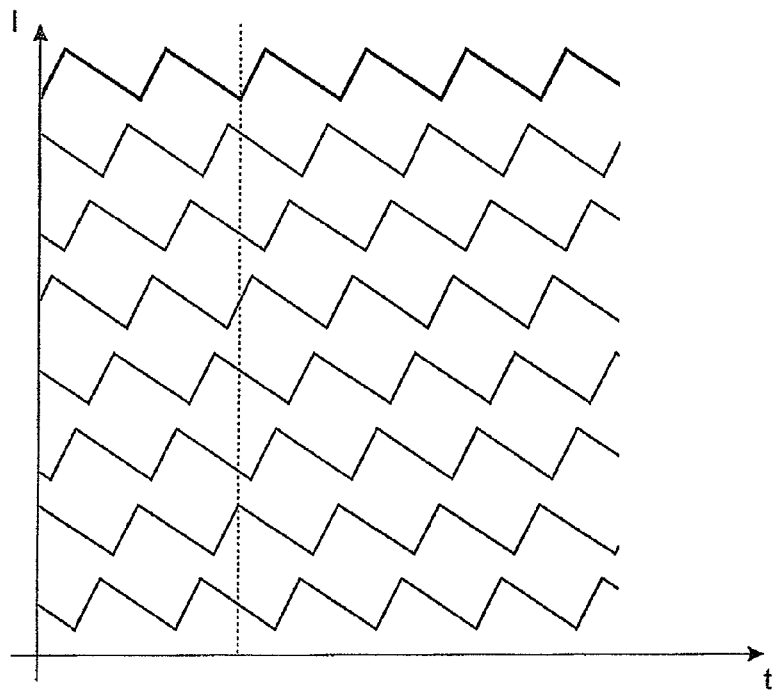

Basically, FIG. 3b shows the same electrical current paths as FIG. 3a, however with another amplification factor between the output of unregulated voltage source 12 and output 144, 146 of regulated voltage source 10. This takes place through a changed sensing ratio when switching power transistors 170, 172 and is shown by the changed coil current, which is again represented without the effects of the transformer effect. Even with a changed sensing ratio, said coupling of adjoining step-up converters 14 via their coils leads to a linearization of the electrical current loads of unregulated voltage sources 33. By providing each regulated voltage source 10 with a regulating device 30, MPP tracking for achieving the best possible efficiency of a photovoltaic installation may also be realized.

Figure 4:
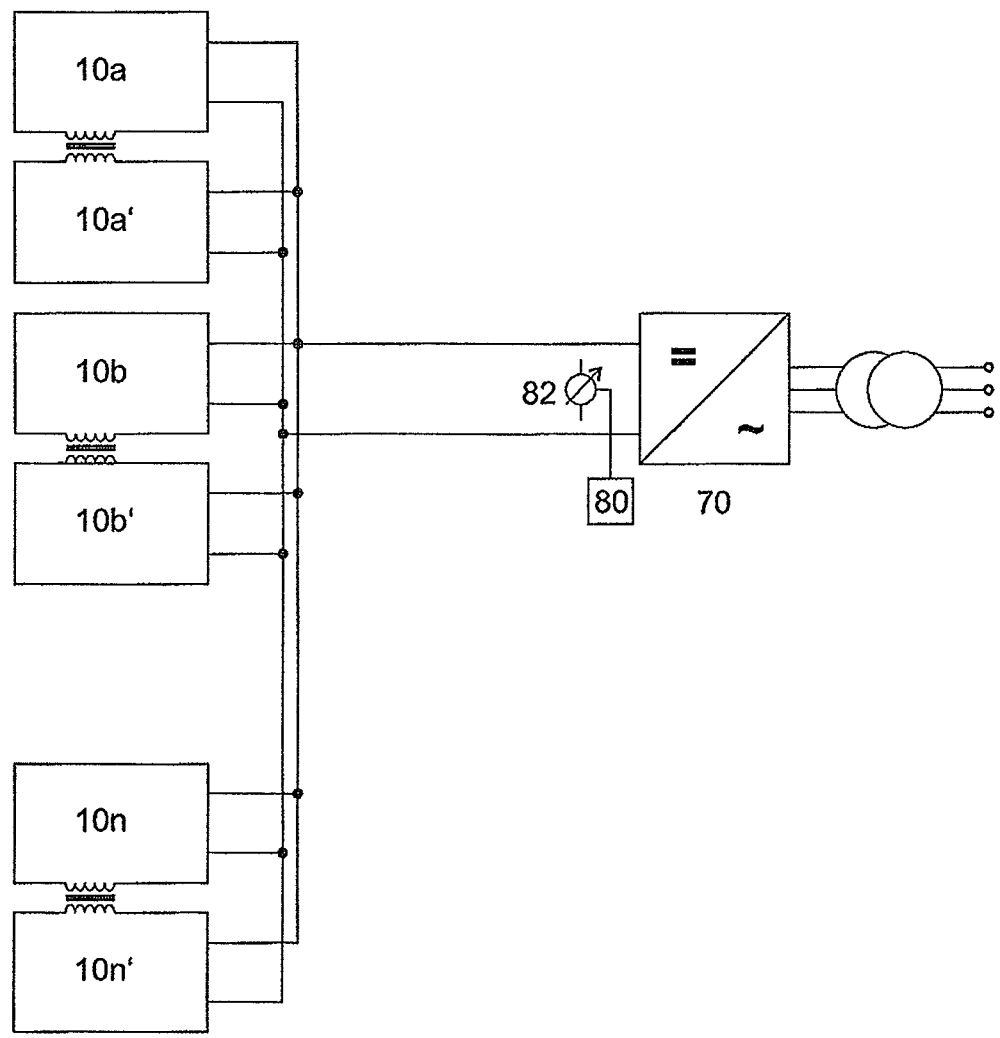
FIG. 4 shows a further circuit in accordance with the invention.

FIG. 4 shows a further embodiment by the inventive circuit. Again, a plurality of regulated voltage sources 10a-10n' is represented. However, in this embodiment, only adjoining regulated voltage sources 10a, 10a'-10n, 10n' are transformatorily connected with each other in pairs by means of a common core 40.

For this purpose, a first coil of a regulated voltage source is connected with a second coil of an adjacent regulated voltage source. The further coils, the second one of the first and the first coil of the regulated voltage source do not have any further transformatory coupling.

The positive outputs of regulated voltage sources 10 are connected with each other and with the associated input of an a.c.-d.c. converter circuit 70 over a connecting line.

With such an embodiment of the circuit arrangement it is preferred to clock the adjoining and transformatorily connected regulated voltage sources, offset by exactly $\pi/2$ in respect to each other. A synchronization between several pairs is not necessarily provided.

As shown in FIG. 1, it is possible to smooth the voltage in unregulated voltage source 12 by placing a capacitor 126 in parallel therewith connected to outputs 122, 124 thereof.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A circuit for providing a.c. power from a plurality of unregulated voltage sources, each of the unregulated voltage sources having outputs for outputting a temporally variable output d.c. voltage, wherein the circuit comprises:
a plurality of regulated voltage sources, switched parallel, each regulated voltage source being configured to receive power from a respective one of the plurality of unregulated voltage sources, each of said plurality of regulated voltage sources including a step-up converter and an associated regulating device;
an a.c.-d.c. converter circuit; and
a regulating unit;
wherein each said step-up converter has
a positive input connected to one of the outputs of the respective unregulated voltage source thereby forming a positive branch,
a first coil positioned in said positive branch downstream of said positive input,
a negative input connected to another of the outputs of the respective unregulated voltage source thereby forming a negative branch, and
a second coil positioned in said negative branch downstream of said negative input, and
a semi-bridge circuit connecting said first and second coils, said semi-bridge circuit including
at least first and second power transistors having a first center tap therebetween,
at least first and second capacitors connected in series having a second center tap therebetween, said second center tap being connected to said first center tap,
a first diode in said positive branch downstream of said first coil, said first diode having an anode connected to said first power transistor and a cathode connected to said first capacitor, said cathode thereof also forming a first output of said regulated voltage source, and
a second diode in said negative branch downstream of said second coil, said second diode having a cathode connected to said second power transistor and an anode connected to said second capacitor, said cathode thereof also forming a second output of said regulated voltage source,
wherein said regulating unit includes a measuring device for measuring an intermediate circuit voltage of said a.c.-d.c. converter circuit and is connected with said regulating devices for controlling the regulated voltage sources.

2. The circuit of claim 1, wherein a third capacitor is respectively provided between said outputs of the unregulated voltage source.

3. The circuit of claim 1, further comprising a plurality of substantially identical circuits as claimed in claim 1, wherein said first coil of a first of said plurality of circuits and said second coil of an adjoining circuit are arranged on a common core.

4. A method for controlling a circuit for providing a.c. power from a plurality of unregulated voltage sources, each of the unregulated voltage sources having outputs for outputting a temporally variable output d.c. voltage, the circuit comprising:
 a plurality of regulated voltage sources, switched parallel, each regulated voltage source being configured to receive power from a respective one of the plurality of unregulated voltage sources, each of said plurality of regulated voltage sources including a step-up converter and an associated regulating device;
 an a.c.-d.c. converter circuit; and
 a regulating unit;
 wherein each said step-up converter has
  a positive input connected to one of the outputs of the respective unregulated voltage source thereby forming a positive branch,
  a first coil positioned in said positive branch downstream of said positive input,
  a negative input connected to another of the outputs of the respective unregulated voltage source thereby forming a negative branch, and
  a second coil positioned in said negative branch downstream of said negative input, and
 a semi-bridge circuit connecting said first and second coils, said semi-bridge circuit including
  at least first and second power transistors having a first center tap therebetween,
  at least first and second capacitors connected in series having a second center tap therebetween, said second center tap being connected to said first center tap,
  a first diode in said positive branch downstream of said first coil, said first diode having an anode connected to said first power transistor and a cathode connected to said first capacitor, said cathode thereof also forming a first output of said regulated voltage source, and
  a second diode in said negative branch downstream of said second coil, said second diode having a cathode connected to said second power transistor and an anode connected to said second capacitor, said cathode thereof also forming a second output of said regulated voltage source,
 wherein said regulating unit includes a measuring device for measuring an intermediate circuit voltage of said a.c.-d.c. converter circuit and is connected with said regulating devices for controlling the regulated voltage sources;
 wherein said regulating unit determines said intermediate circuit voltage and from this determines, as a function of the maximally and minimally permissible intermediate circuit voltage, a set-point value for the output voltage of said regulated voltage source and transmits this to said regulating device, and from this set-point value said regulating device determine control conditions for said step-up converter.

5. The method of claim 4, wherein said regulating devices report at least one of the output d.c. voltage of said unregulated voltage sources and the amplification factor of their own step-up converter back to said regulating unit, and said regulating unit determines from this a new set-point value of the output voltage for said regulated voltage sources.

6. The method of claim 4, wherein said step-up converters of two adjoining regulated voltage sources, are connected by means of a common core, and are clocked in a temporally offset manner from each other within a switching period at a total offset of approximately a quarter of the switching period.

7. The method of claim 5, wherein said step-up converters of two adjoining regulated voltage sources, are connected by means of a common core, and are clocked in a temporally offset manner from each other within a switching period at a total offset of approximately a quarter of the switching period.

8. The method of claim 4, wherein said step-up converters are clocked in a temporally offset manner from each other within a switching period at a total offset, which is approximately a quarter of the switching period.

9. The method of claim 4, wherein said step-up converters are clocked in a temporally offset manner from each other within a switching period at a total offset, which is approximately a quarter of the switching period.

10. The method of claim 8, wherein the total offset is formed from an offset of exactly a quarter of the switching period and of a respective phase shift of adjoining step-up converters, wherein said phase shift is proportional to the reciprocal value of the number of voltage sources.

11. The method of claim 8, wherein the total offset is formed from an offset of exactly a quarter of the switching period and of a respective phase shift of adjoining step-up converters, wherein said phase shift is proportional to the reciprocal value of a small multiple of the number of voltage sources.

12. The method of claim 9, wherein the total offset is formed from an offset of exactly a quarter of the switching period and of a respective phase shift of adjoining step-up converters, wherein said phase shift is proportional to the reciprocal value of the number of voltage sources.

13. The method of claim 9, wherein the total offset is formed from an offset of exactly a quarter of the switching period and of a respective phase shift of adjoining step-up converters, wherein said phase shift is proportional to the reciprocal value of a small multiple of the number of voltage sources.

* * * * *